US009076051B2

(12) United States Patent
Li et al.

(10) Patent No.: US 9,076,051 B2
(45) Date of Patent: Jul. 7, 2015

(54) COLLISION DETECTION METHOD FOR A RADIO-FREQUENCY SIM CARD WITH LOW-FREQUENCY MAGNETIC COMMUNICATION

(75) Inventors: Meixiang Li, Shenzhen Guangdong (CN); Xianwei Yang, Shenzhen Guangdong (CN)

(73) Assignee: NATIONZ TECHNOLOGIES INC., Shenzhen, Guangdong (CN)

(*) Notice: Subject to any disclaimer, the term of this patent is extended or adjusted under 35 U.S.C. 154(b) by 224 days.

(21) Appl. No.: 13/638,168

(22) PCT Filed: Apr. 16, 2010

(86) PCT No.: PCT/CN2010/071819
§ 371 (c)(1),
(2), (4) Date: Sep. 28, 2012

(87) PCT Pub. No.: WO2011/120241
PCT Pub. Date: Oct. 6, 2011

(65) Prior Publication Data
US 2013/0012132 A1    Jan. 10, 2013

(30) Foreign Application Priority Data

Apr. 2, 2010    (CN) .......................... 2010 1 0138492

(51) Int. Cl.
*H04B 7/00*    (2006.01)
*G06K 7/10*    (2006.01)

(52) U.S. Cl.
CPC ........ *G06K 7/10128* (2013.01); *G06K 7/10019* (2013.01); *G06K 7/10356* (2013.01); *G06K 7/10475* (2013.01)

(58) Field of Classification Search
CPC .......... G06K 7/10019; G06K 7/10128; G06K 7/10356; G06K 7/10475
USPC ......... 455/41.1, 41.2; 235/378, 383, 449, 451
See application file for complete search history.

(56) References Cited

U.S. PATENT DOCUMENTS 7,257,374 B1 *   8/2007   Creigh .......................... 455/41.2
7,624,918 B2 *   12/2009  Sweeney et al. .............. 235/378
(Continued)

FOREIGN PATENT DOCUMENTS

CN    101023434 A    8/2007
CN    101330303 A    12/2008

OTHER PUBLICATIONS

Written Opinion of the International Searching Authority dated (mailed) Jan. 13, 2011; issued in related Application No. PCT/CN2010/071819 for Nationz Technologies, Inc., et al. (4 pgs.).
(Continued)

*Primary Examiner* — Wesley Kim
*Assistant Examiner* — Raj Chakraborty
(74) *Attorney, Agent, or Firm* — Young, Basile, Hanlon & MacFarlane, P.C.

(57) ABSTRACT

A collision detection method for a radio-frequency SIM card with low-frequency magnetic communication comprises: transmitting by a card reader low-frequency card seeking characteristic information; determining by a radio-frequency SIM card A whether an intensity of a low-frequency magnetic induction signal reaches a preset threshold value; if yes, receiving low-frequency card seeking characteristic information and transmitting card seeking response information through a radio-frequency channel; receiving by the card reader the card seeking response information, establishing a radio-frequency connection with the radio-frequency SIM card A, and opening a preset time window; when the preset time window closes, interrupting by the card reader a transaction process with the radio-frequency SIM card A and re-transmitting the low-frequency card seeking characteristic information; if receiving by the card reader card seeking response information transmitted by another radio-frequency SIM card B, ascertaining that a radio-frequency SIM card collision exists.

6 Claims, 4 Drawing Sheets

(56) References Cited

U.S. PATENT DOCUMENTS

| | | | |
|---|---|---|---|
| 2004/0198222 A1* | 10/2004 | Ertin et al. | 455/41.1 |
| 2006/0144943 A1 | 7/2006 | Kim | |
| 2006/0175400 A1* | 8/2006 | Sweeney et al. | 235/383 |
| 2006/0175406 A1* | 8/2006 | Dressen | 235/451 |
| 2006/0261938 A1* | 11/2006 | Lai et al. | 340/505 |
| 2008/0129485 A1* | 6/2008 | Tuttle | 340/539.11 |
| 2009/0127337 A1* | 5/2009 | Kargl | 235/449 |

OTHER PUBLICATIONS

Wang, Wen-chuang et al.; "Radio frequency identification middleware data filtering algorithm based on dynamic time window"; www.cnki.com.cn/Article_en/CJFDTOTAL-XXYD200903004.html; Information and Electronic Engineering; Mar. 2009.

\* cited by examiner

COLLISION DETECTION METHOD FOR A RADIO-FREQUENCY SIM CARD WITH LOW-FREQUENCY MAGNETIC COMMUNICATION

TECHNICAL FIELD

This invention relates to the communication field, especially to a collision detection method for a radio-frequency SIM card with low-frequency magnetic communication.

TECHNICAL BACKGROUND

Along with the development of the mobile communication technology, the mobile communication terminal has been much popularized as a popular consumer product. The SIM (Subscriber Identity Model) card, as an important part of the mobile communication terminal, is broadly used. To satisfy the continuously increasing use experiences of the people for mobile communication terminals, a SIM card with multiple new functions is developed and is put into use. A radio-frequency SIM card with low-frequency magnetic communication is one of the examples.

The radio-frequency SIM card with low-frequency magnetic communication is a SIM card with functions of radio-frequency communication, low-frequency magnetic communication, and low-frequency magnetic induction intensity detection. It comprises a card body and an integrated circuit in the card body. The card body of the radio-frequency SIM card comprises a SIM card interface that matches with a mobile phone. The integrated circuit in the card body comprises: a central processing unit (CPU); a SIM card memory, a radio-frequency transceiver circuit, and an interface circuit that are electrically connected with the CPU, respectively; and a radio-frequency transceiver antenna electrically connected with the radio-frequency transceiver circuit. The radio-frequency SIM card not only can communicate with the mobile communication terminal to realize functions of a normal SIM card but also can conduct short-distance communication with matching external processing devices (e.g. a card reader) through the radio-frequency transceiver circuit and interface circuit. The communication process and content is processed specifically by the central processing unit CPU inside the radio-frequency SIM card.

The radio-frequency SIM card with low-frequency magnetic communication is mostly used in a mobile phone. Besides all the functions of a normal SIM card, it can also allow the mobile phone to have functions of smart cards such as a public transit card, an entrance guard communication card, a credit card, a small-amount payment card, and a time card. Moreover, the information generated when the various smart card functions are used can be displayed directly on a screen of the mobile phone and the user can accomplish the various operations through a keyboard of the mobile phone.

When a radio-frequency SIM card with low-frequency magnetic communication is used as smart cards such as a public transit card, an entrance guard communication card, a credit card, a small-amount payment card, and a time card, the working principle is as follows: between the card reader and the radio-frequency SIM card, a transaction distance control is implemented through a low-frequency channel and a transaction is conducted through the radio-frequency channel. The short-distance communication process between the card reader and the radio-frequency SIM card is as follows: the card reader transmits a low-frequency signal, and the radio-frequency SIM card receives this low-frequency signal and examines its intensity. If the intensity of the low-frequency signal received by the radio-frequency SIM card reaches a preset threshold value, it indicates that the radio-frequency SIM card has entered the transaction scope of the card reader and a transaction is allowed. Now the radio-frequency communication part of the radio-frequency SIM card is activated, and the radio-frequency SIM card carries out the transaction with the card reader through the radio-frequency channel. If the intensity of the low-frequency signal received by the radio-frequency SIM card does not reach the preset threshold value, it indicates that the radio-frequency SIM card has not entered the transaction scope of the card reader and the transaction is not allowed. Now the radio-frequency communication part of the radio-frequency SIM card is not activated, and the radio-frequency SIM card can not establish a connection of the radio-frequency channel with the card reader.

To avoid a misreading operation, the radio-frequency SIM card needs to enter a certain scope of the card reader to trigger the transaction function. With the low-frequency magnetic induction intensity detection, the distance between different types of mobile communication terminals and the card reader can be controlled effectively within a certain scope. Moreover, in typical radio-frequency SIM card applications, when the radio-frequency SIM card is used as a kind of identification or a small-amount payment tool, to increase the application convenience, the transaction result is normally not displayed on a screen of the mobile communication terminal for the user to confirm.

In the existing short-distance communication system of a radio-frequency SIM card with low-frequency magnetic communication, if two or more radio-frequency SIM cards exist within a transaction scope (also referred to as a card swiping scope in this application), the card reader will randomly connect with either of them to conduct a transaction. In this case, we find that when two or more radio-frequency SIM cards exist concurrently within the transaction scope, one of the radio-frequency SIM cards will be transacted firstly but the user cannot determine which one is transacted.

In another case, the existing low-frequency magnetic communication card reader transmits characteristic information to a radio-frequency SIM card through a low-frequency channel and realizes the unique binding between the radio-frequency SIM card and the card reader through the characteristic information. However, the physical properties of the low-frequency channel decide that its data transmission rate cannot be very high. Therefore, it is impossible to transmit too much low-frequency card reader identification information through the low-frequency channel. When multiple card readers with low-frequency magnetic communication exist in a scope of a same scene (e.g. a subway gate, a supermarket payment exit, etc.), their low-frequency card seeking characteristic information may repeat. When the characteristic information repeats, if the radio-frequency SIM card with low-frequency magnetic communication is activated on a card reader, its radio-frequency channel may communicate with another adjacent card reader that transmits the same low-frequency characteristic information.

The above two situations are uncertain transaction processes caused by the concurrent existence of multiple card readers and multiple radio-frequency SIM cards. We define such a kind of uncertain transactions as a radio-frequency SIM card collision, and define the zone where such uncertain transactions may appear as a radio-frequency SIM card transaction collision zone. The generation of the collision brings certain hidden dangers to the safety and reliability of a radio-frequency SIM card transaction.

One method for resolving the above problem is to display the transaction information on the mobile communication terminal during the transaction for the user to confirm. However, this method sacrifices the use convenience. Therefore, how to avoid the hidden dangers to the safety and reliability of the radio-frequency SIM card transaction without sacrificing the use convenience is a problem to be resolved.

SUMMARY OF THE INVENTION

The technical problem to be resolved by this invention is to provide with a collision detection method for a radio-frequency SIM card with low-frequency magnetic communication. The method can improve the safety and reliability of radio-frequency SIM card transactions while ensuring the use convenience of users.

To resolve the above described technical problem, this invention proposes a collision detection method for a radio-frequency SIM card with low-frequency magnetic communication. The method is applied to a short-distance communication system comprising a card reader and multiple radio-frequency SIM cards. The method comprises the following steps:

Step a: a card reader transmits low-frequency card seeking characteristic information.

Step b: radio-frequency SIM card A determines whether the intensity of a low-frequency magnetic induction signal reaches a preset threshold value. If yes, it will receive the low-frequency card seeking characteristic information and transmit card seeking response information through a radio-frequency channel.

Step c: the card reader receives the card seeking response information, establishes a radio-frequency connection with the radio-frequency SIM card A, and opens a preset time window.

Step d: when the preset time window closes, the card reader interrupts a transaction process with the radio-frequency SIM card A and re-transmits the low-frequency card seeking characteristic information.

Step e: if the card reader receives the card seeking response information transmitted by another radio-frequency SIM card B, a radio-frequency SIM card collision exists.

Moreover, the above described method is also characterized in that, in the Step b, if the intensity of the low-frequency magnetic induction signal does not reach the preset threshold value, the radio-frequency SIM card A does not establish a radio-frequency connection with the card reader.

In addition, the above described method is also characterized in that, in the Step e, if the card reader does not receive any card seeking response information transmitted by another radio-frequency SIM card B, the card reader continues the transaction with the radio-frequency SIM card A until the transaction is completed.

Further, the above described method is also characterized in that, after the Step e, it also comprises Step f: the card reader disconnects the connections with the radio-frequency SIM card A and the radio-frequency SIM card B.

Furthermore, the above described method is also characterized in that the low-frequency card seeking characteristic information is generated by each card reader randomly. The information keeps unchanged in a card seeking process, but is different among different card seeking processes.

To resolve the above described technical problem, this invention also discloses another collision detection method for a radio-frequency SIM card with low-frequency magnetic communication. The method applies to a short-distance communication system comprising at least two card readers and multiple radio-frequency SIM cards. The method comprises the following steps:

Step a: at least two card readers transmit the same low-frequency card seeking characteristic information at a same time.

Step b: a card reader receives card seeking response information transmitted by radio-frequency SIM card A through a radio-frequency channel. The card seeking response information carries an identification code IDA and a random number RN of the radio-frequency SIM card A.

Step c: the card reader carries out an MAC operation on the card seeking characteristic information, the identification code IDA, and the random number RN, obtains unique MAC information for confirming a pair of a card reader and a radio-frequency SIM card, and transmits the MAC information through a low-frequency channel.

Step d: if the radio-frequency SIM card A receives the MAC information, it compares the MAC information with an MAC operation result of the radio-frequency SIM card A itself. If they are inconsistent, a collision is detected.

In addition, the above described method is also characterized in that, in the Step d, the MAC operation result of the radio-frequency SIM card A itself is the result obtained after the radio-frequency SIM card A carries out an MAC operation on the low-frequency card seeking characteristic information, its identification code IDA, and a random number RN generated by itself.

Moreover, the above described method is also characterized in that, in the Step d, if the MAC information received by the radio-frequency SIM card A is consistent with the MAC operation result of the card itself, a transaction between the card reader and the radio-frequency SIM card A is legal, and the card reader and the radio-frequency SIM card A continue the transaction until the transaction is completed.

Further, the above described method is also characterized in that, after the Step d, it also includes Step e: the card reader disconnects the connection with the radio-frequency SIM card A.

Furthermore, the above described method is also characterized in that, in the Step b, the random number RN is generated by the radio-frequency SIM card. The random number RN keeps unchanged in a card seeking process, but is different among different card seeking processes.

The collision detection method for a radio-frequency SIM card with low-frequency magnetic communication provided by this invention can improve the safety and reliability of a radio-frequency SIM card transaction while ensuring the use convenience of the user.

DESCRIPTION OF THE EMBODIMENTS

The main concept in accordance with embodiments of this invention is as follows: detecting an existence of a radio-frequency SIM card collision can be achieved by transmitting low-frequency card seeking characteristic information for two or more times in a certain period of time so a corresponding application treatment can be done in case of a collision, e.g. prohibiting a transaction between two or more radio-frequency SIM cards involved in the collision. This can ensure the safety and reliability of the radio-frequency SIM card transaction. Moreover, because no human participation is needed in this process, the use convenience of the radio-frequency SIM card will not be sacrificed.

First of all, a brief introduction is given to a radio-frequency SIM card and a card reader in accordance with an embodiment of this invention.

Figure 1:
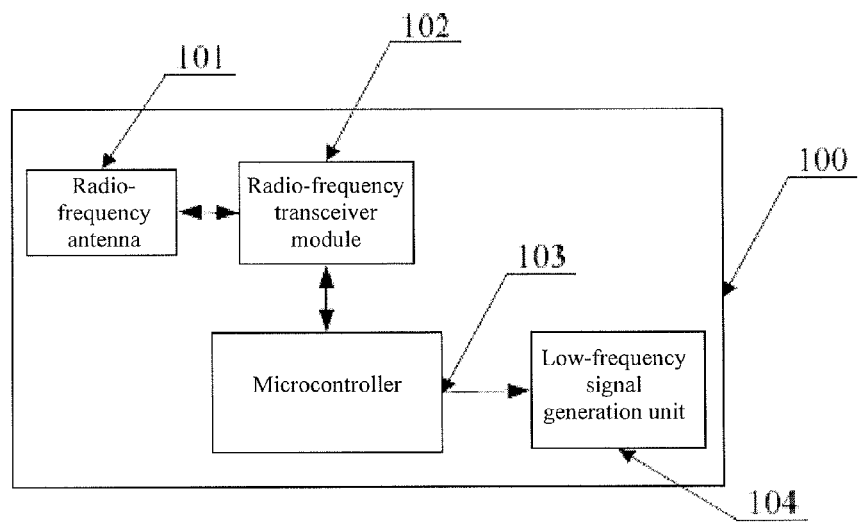
FIG. 1 is a structural block diagram illustrating a card reader in accordance with an embodiment of this invention.

FIG. 1 is a structural block diagram illustrating a card reader in accordance with an embodiment of this invention. As shown in FIG. 1, a card reader 100, which in accordance with this invention can carry out short-distance communication with a radio-frequency SIM card, comprises at least one microcontroller 103, at least one radio-frequency transceiver module 102, at least one radio-frequency antenna 101, and at least one group of low-frequency signal generation units 104. The microcontroller 103 processes the information transmitted and received by the radio-frequency transceiver module 102 and generates low-frequency data information. The radio-frequency transceiver module 102 is connected with the microcontroller 103 and the radio-frequency antenna 101, and is used for transmitting and receiving radio-frequency signals. The radio-frequency antenna 101 detects and radiates radio-frequency signals. The low-frequency signal generation unit 104 is connected with the microcontroller 103 and transmits the low-frequency data information generated by the microcontroller 103.

Figure 2:
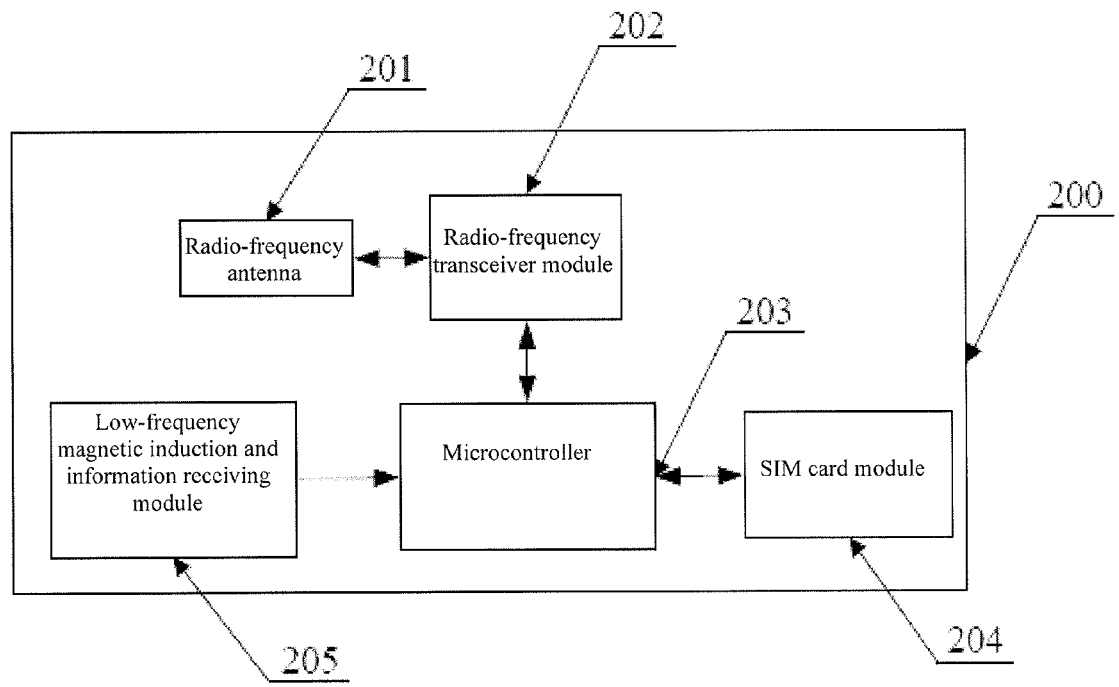
FIG. 2 is a structural block diagram illustrating a radio-frequency SIM card in accordance with an embodiment of this invention.

A radio-frequency SIM card in accordance with this invention is a radio-frequency SIM card with low-frequency magnetic communication. FIG. 2 is a structural block diagram illustrating a radio-frequency SIM card in accordance with an embodiment of this invention. As shown in FIG. 2, a radio-frequency SIM card 200 comprises at least one radio-frequency transceiver module 202, at least one radio-frequency antenna 201, at least one microcontroller 203, at least one low-frequency magnetic induction and information receiving module 205, and one SIM card module 204. The radio-frequency transceiver module 202 is connected with the radio-frequency antenna 201 and the microcontroller 203, respectively, and is used for transmitting and receiving radio-frequency signals. The microcontroller 203 is used to process the transmitted and received radio-frequency information and the received low-frequency magnetic induction information. The radio-frequency antenna 201 is used to detect and radiate radio-frequency signals. The SIM card module 204 processes a SIM card application of a mobile communication terminal. The low-frequency magnetic induction and information receiving module 205 is used to sense, receive, and detect an intensity of a low-frequency magnetic field transmitted by a low-frequency signal generation unit 104 of a card reader to confirm if the radio-frequency SIM card 200 is within a preset transaction distance. And the low-frequency magnetic induction and information receiving module 205 also receives low-frequency magnetic communication information.

The principles and features of this invention are described in combination with the attached figures and embodiments as follows. The examples are given only for illustrating this invention and are not intended to limit the scope of this invention.

Exemplary Embodiment 1

Figure 3:
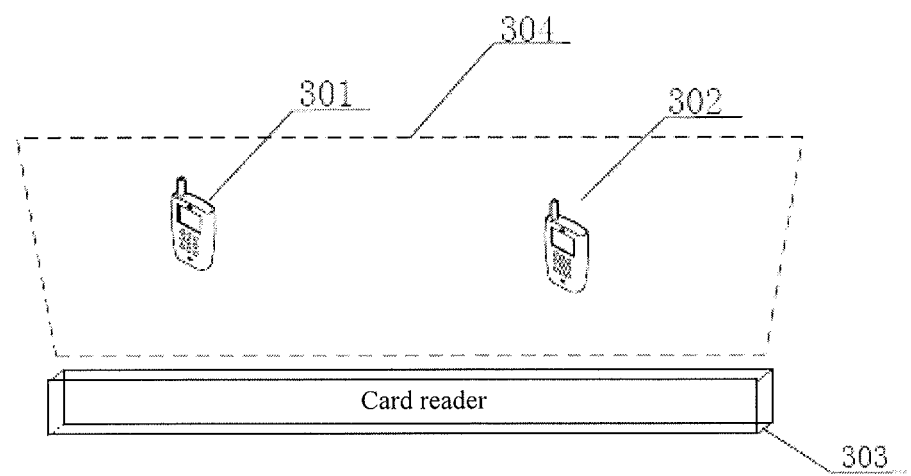
FIG. 3 is a diagram illustrating an exemplary situation of a radio-frequency SIM card collision in accordance with an embodiment of this invention.

FIG. 3 is a diagram illustrating an exemplary situation of a radio-frequency SIM card collision in accordance with Embodiment 1 of this invention. As shown in FIG. 3, two radio-frequency SIM cards (a radio-frequency SIM card 301 and a radio-frequency SIM card 302) enter a transaction scope 304 of a card reader 303 at a same time. The radio-frequency SIM card 301 and the radio-frequency SIM card 302 open a radio-frequency receiving function. The card reader 303 firstly finds the radio-frequency SIM card 301 through low-frequency card seeking characteristic information, sets to open a time window, and starts a transaction process with the radio-frequency SIM card 301. When the time window closes, the card reader 303 interrupts the current transaction process with the radio-frequency SIM card 301. It turns to re-transmit the low-frequency card seeking characteristic information. If, at this moment, the card reader 303 finds another radio-frequency SIM card 302, it determines that a radio-frequency SIM card collision exists. The card reader 303 respectively disconnects the connection with the radio-frequency SIM card 301 and the connection with radio-frequency SIM card 302, and restarts card seeking.

Figure 5:
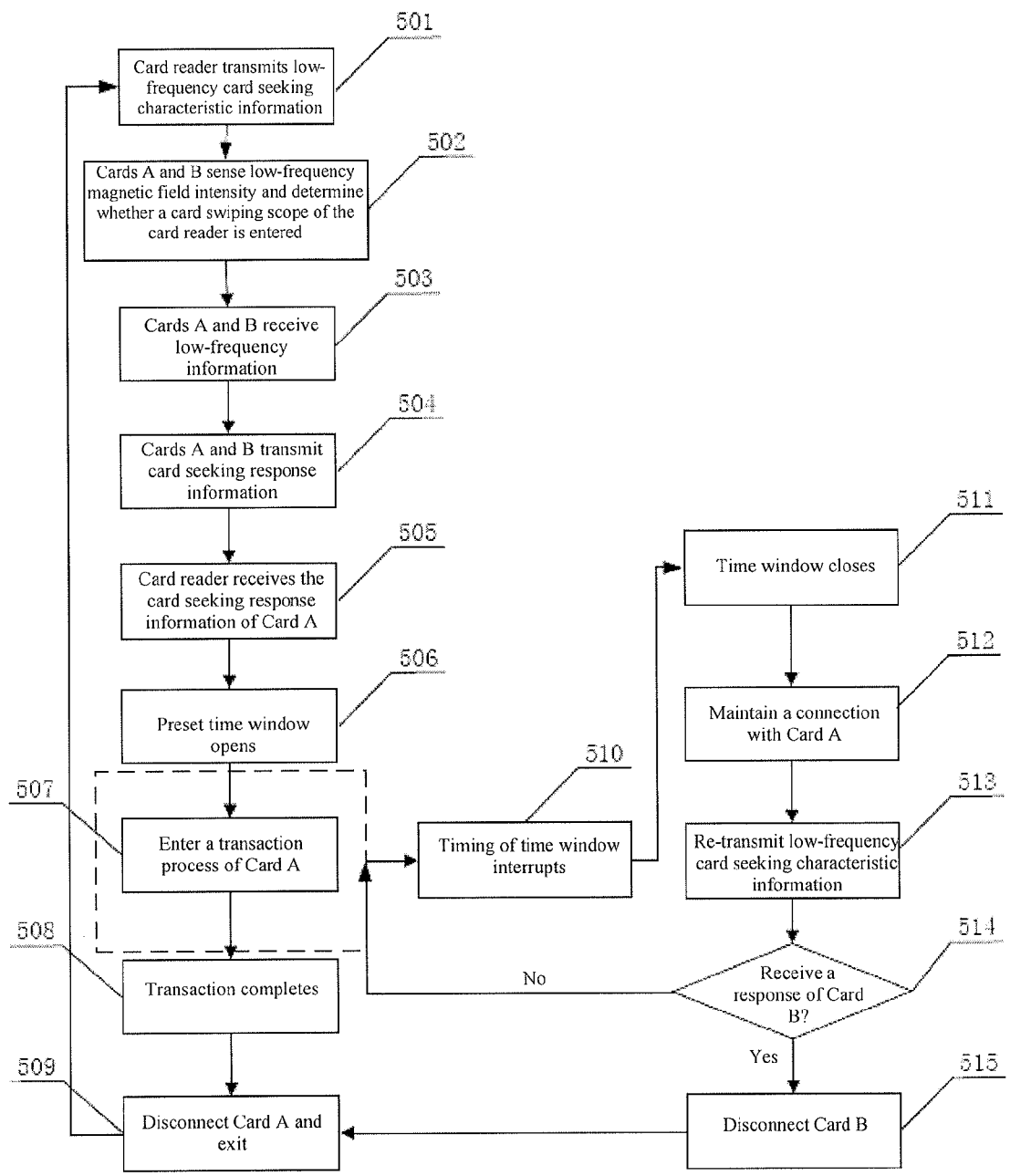
FIG. 5 is a flow chart illustrating an exemplary collision detection method for a radio-frequency SIM card with low-frequency magnetic communication in accordance with an embodiment of this invention.

FIG. 5 is a flow chart illustrating an exemplary collision detection method for a radio-frequency SIM card with low-frequency magnetic communication in accordance with Embodiment 1 of this invention. As shown in FIG. 5, in this embodiment, an exemplary collision detection process of a radio-frequency SIM card with low-frequency magnetic communication comprises the following steps:

Step 501: a card reader transmits low-frequency card seeking characteristic information.

Step 502: a radio-frequency SIM card A and a radio-frequency SIM card B sense a low-frequency magnetic field signal, detect an intensity of a low-frequency magnetic field, and determine whether a card swiping scope of the card reader is entered. If yes, radio-frequency SIM cards A and B execute Step 503; otherwise, repeat this Step 502.

Comparing the sensed low-frequency magnetic field intensity with a preset threshold value to determine whether a card swiping scope of a card reader is entered is a normally adopted method for a radio-frequency SIM card. Of course, in other embodiments of this invention, other methods can also be adopted for determining whether a radio-frequency SIM card has entered a card swiping scope of a card reader.

Step 503: the radio-frequency SIM card A and radio-frequency SIM card B receive card seeking characteristic information carried by the low-frequency magnetic field.

Step 504: the radio-frequency SIM card A and radio-frequency SIM card B transmit card seeking response information.

Step 505: the card reader receives the card seeking response information of the radio-frequency SIM card A.

Step 506: the card reader opens a preset time window.

Step 507: the card reader and the radio-frequency SIM card A enter a transaction process and execute Step 510.

Step 510: The timing of the time window interrupts.

Step 511: The time window closes.

The time window can be a very short period of time or even 0. That is, after the card reader receives card seeking response information of a radio-frequency SIM card, it transmits low-frequency card seeking characteristic information immediately.

Step 512: The card reader maintains a connection with the radio-frequency SIM card A.

Step 513: The card reader re-transmits the low-frequency card seeking characteristic information.

Step 514: The card reader determines whether having received card seeking response information of the radio-frequency SIM card B. If yes, the card reader executes Step 515; otherwise, it executes Step 507 until the transaction completes, executing Step 508.

Step 515: The card reader disconnects the connection with the radio-frequency SIM card B and executes Step 509.

Step 508: The transaction completes.

Step 509: The card reader disconnects the connection with the radio-frequency SIM card A and exits.

In FIG. 5, executing Step 514, Step 515, and Step 509 in a sequence means that the card reader receives card seeking response information of the radio-frequency SIM card B and disconnects the connections with the radio-frequency SIM card A and the radio-frequency SIM card B, respectively.

In FIG. 5, executing Step 514, Step 507, Step 508, and Step 509 in a sequence means that the card reader does not receive card seeking response information of the radio-frequency SIM card B within a preset time window and exits after the radio-frequency SIM card A finishes a transaction normally.

In this embodiment, low-frequency card seeking characteristic information is generated by each card reader randomly. This information keeps unchanged in a card seeking process, but is different among different card seeking processes.

In this embodiment, a hypothetical scene is that two radio-frequency SIM cards exist concurrently in a transaction scope of a card reader. In other embodiments of this invention, two or more radio-frequency SIM cards can also exist concurrently in a transaction scope of a card reader. According to a method of this invention, a collision of radio-frequency SIM cards can all be detected. After the collision of radio-frequency SIM cards is detected, the card reader can avoid an occurrence of a wrong transaction by disconnecting a connection and terminating the transaction.

This embodiment shows that in accordance with this invention, a collision detection method for radio-frequency SIM card with low-frequency magnetic communication can improve the safety and reliability of a radio-frequency SIM card transaction without having to sacrifice use convenience of the user.

Exemplary Embodiment 2

Figure 4:
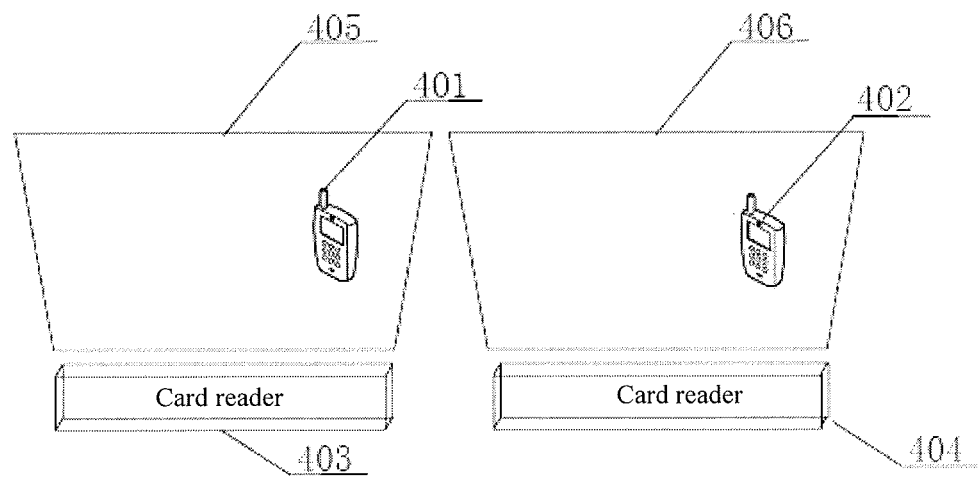
FIG. 4 is a diagram illustrating an exemplary situation of a radio-frequency SIM card collision in accordance with another embodiment of this invention.

FIG. 4 is a diagram illustrating an exemplary situation of a radio-frequency SIM card collision in accordance with Embodiment 2 of this invention. As shown in FIG. 4, two radio-frequency SIM cards (a radio-frequency SIM card 401 and a radio-frequency SIM card 402) enter a transaction scope 405 and a transaction scope 406 of a card reader 403 and a card reader 404, respectively, at a same time (the radio-frequency SIM card 401 enters the transaction scope 405 of the card reader 403 and the radio-frequency SIM card 402 enters the transaction scope 406 of the card reader 404).

The radio-frequency SIM card 401 and the radio-frequency SIM card 402 receive respectively low-frequency card seeking characteristic information, with the same content, transmitted by the card reader 403 and the card reader 404. Then the radio-frequency SIM card 401 and the radio-frequency SIM card 402 carry out an operation on the received low-frequency card seeking characteristic information, their unique identification code ID information and random numbers RNs generated by the radio-frequency SIM cards to obtain MAC information. Next, the radio-frequency SIM card 401 and the radio-frequency SIM card 402, respectively, transmit the card seeking response information containing the unique IDs of themselves and the random numbers RNs to the card reader 403 and the card reader 404 through a radio-frequency channel. After the card reader 403 and the card reader 404 receive the card seeking response information, they transmit, respectively, MAC information (which they calculate based on the card seeking characteristic information of themselves, the received corresponding identification code ID of a radio-frequency SIM card and random number RN information) to the radio-frequency SIM card 401 and the radio-frequency SIM card 402 through a low-frequency channel. After the radio-frequency SIM card 401 and the radio-frequency SIM card 402 receive, respectively, the MAC information transmitted by the card reader 403 and the card reader 404 through low-frequency, they compare it with the MAC information calculated by themselves. If it is inconsistent, it indicates that a collision is detected. If the information is consistent, the card reader 403 and the card reader 404 continue a transaction with the radio-frequency SIM card 401 and the radio-frequency SIM card 402, respectively.

Figure 6:
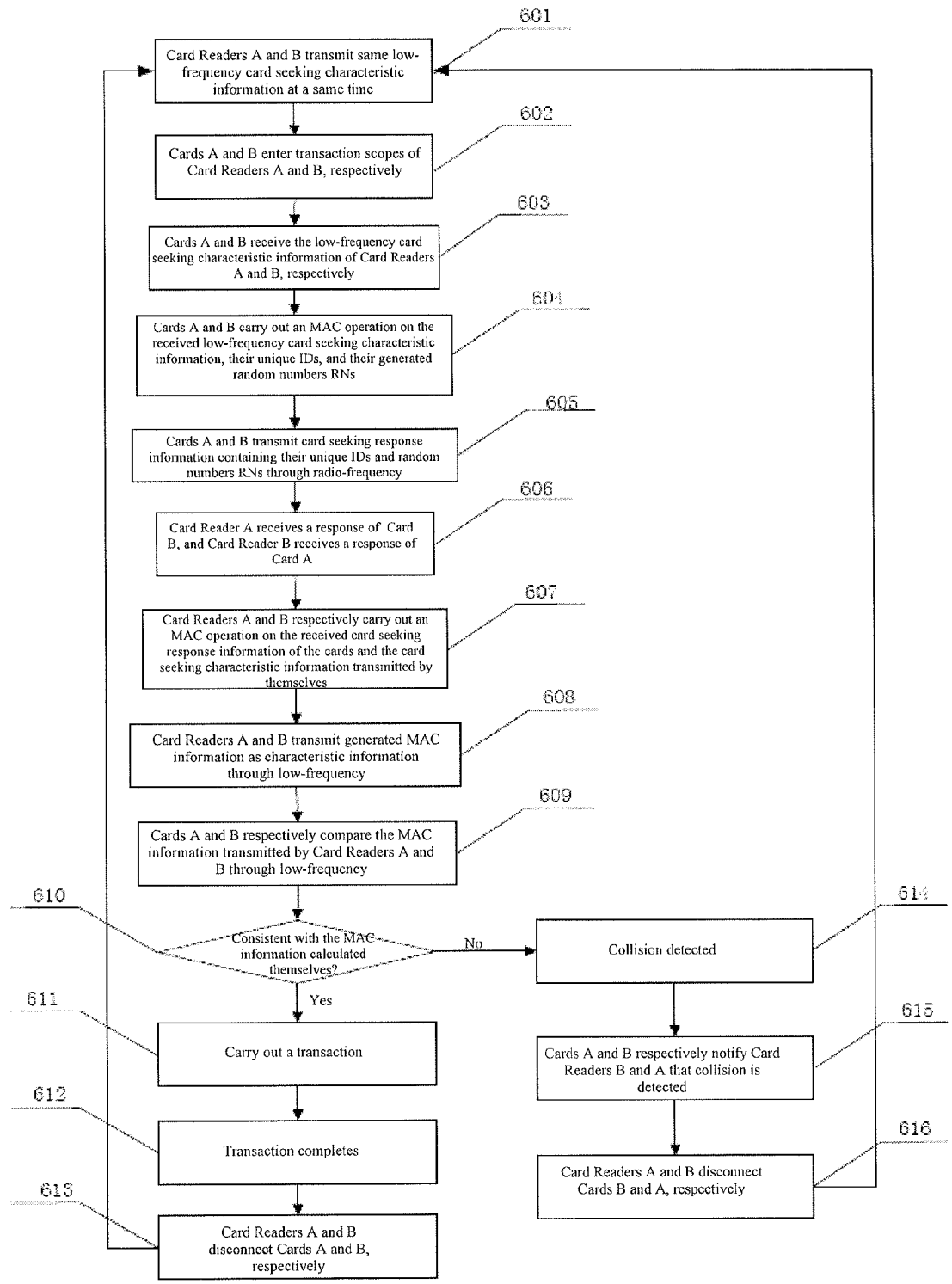
FIG. 6 is a flow chart illustrating an exemplary collision detection method for a radio-frequency SIM card with low-frequency magnetic communication in accordance with another embodiment of this invention.

FIG. 6 is a flow chart illustrating an exemplary collision detection method for a radio-frequency SIM card with low-frequency magnetic communication in accordance with Embodiment 2 of this invention. As shown in FIG. 6, in this embodiment, a collision detection process of a radio-frequency SIM card with low-frequency magnetic communication includes the following steps:

Step 601: a card reader A and a card reader B transmit same low-frequency card seeking characteristic information at a same time.

Step 602: a radio-frequency SIM card A and a radio-frequency SIM card B enter a transaction scope of the card reader A and a transaction scope of the card reader B, respectively.

Step 603: the radio-frequency SIM card A and the radio-frequency SIM card B receive the low-frequency card seeking characteristic information of the card reader A and the card reader B, respectively.

Step 604: the radio-frequency SIM card A and the radio-frequency SIM card B, respectively, carry out an MAC operation on the received low-frequency card seeking characteristic information, its unique identification code ID information, and its generated random number RN to obtain MAC information.

Among them, the random number RN is information generated by a radio-frequency SIM card. The information keeps unchanged in a card seeking process, but is different among different card seeking processes.

Step 605: the radio-frequency SIM card A and radio-frequency SIM card B, respectively, transmit card seeking response information containing its unique ID and random number RN through a radio-frequency channel.

Step 606: the card reader A receives the card seeking response information of the radio-frequency SIM card B, and the card reader B receives the card seeking response information of the radio-frequency SIM card A.

Step 607: the card reader A and the card reader B, respectively, carry out an MAC operation on the received card seeking response information of the radio-frequency SIM card and the card seeking characteristic information transmitted by the card reader to obtain MAC information.

Step 608: the card reader A and the card reader B transmit their generated MAC information as characteristic information through low-frequency.

Step 609: the radio-frequency SIM card A and radio-frequency SIM card B compare, respectively, the MAC information transmitted by the card reader A and the card reader B through low-frequency, with the MAC information calculated by the radio-frequency SIM card.

Step 610: the radio-frequency SIM card A and the radio-frequency SIM card B respectively determine whether the received MAC information is consistent with the MAC information calculated by themselves. If yes, Step 611 is executed; otherwise, Step 614 is executed.

Step 611: the radio-frequency SIM card A and the radio-frequency SIM card B transact, respectively, with the card readers with which a connection has been established. That is, the radio-frequency SIM card A transacts with the card reader A and the radio-frequency SIM card B transacts with the card reader B.

Step 612: the transaction completes.

Step 613: the card reader A and the card reader B disconnect the connection with the radio-frequency SIM card A and the connection with the radio-frequency SIM card B, respectively.

Step 614: a collision is detected.

Step 615: the radio-frequency SIM card A and the radio-frequency SIM card B, respectively, notify the card reader B and the card reader A that a collision is detected. That is, the radio-frequency SIM card A notifies the card reader B of the detection of a collision and the radio-frequency SIM card B notifies the card reader A of the detection of a collision.

Step 616: the radio-frequency SIM card A and the radio-frequency SIM card B, respectively, disconnect the connection with the card reader B and the connection with the card reader A. That is, the radio-frequency SIM card A disconnects the connection with the card reader B and the radio-frequency SIM card B disconnects the connection with the card reader A.

In this embodiment, card seeking response information contains a unique identification code ID of each radio-frequency SIM card and information RN generated by each radio-frequency SIM card. The information RN keeps unchanged in a card seeking process, but is different among different card seeking processes.

In this embodiment, a hypothetical scene is that two card readers transmit same low-frequency card seeking characteristic information at a same time. In other embodiments of this invention, two or more card readers also transmit same low-frequency card seeking characteristic information. According to a method of this invention, a collision of radio-frequency SIM cards can all be detected. After a collision of radio-frequency SIM cards is detected, the card reader can avoid an occurrence of a wrong transaction by disconnecting a connection and terminating the transaction.

This embodiment shows that in accordance with this invention, a collision detection method for a radio-frequency SIM card with low-frequency magnetic communication can improve the safety and reliability of a radio-frequency SIM card transaction without having to sacrifice the use convenience of the user.

The above descriptions are just some exemplary embodiments of this invention and are not intended to limit the scope of this invention. Any modifications, equivalent substitutions, and improvements made within the spirit and principle of this invention shall be included in the protection scope of this invention.

What is claimed is:

1. A collision detection method for a radio-frequency Subscriber Identity Module (SIM) card with low-frequency magnetic communication is used in a short-distance communication system comprising a card reader and multiple radio-frequency SIM cards, the method comprising:
   Step a: transmitting, by the card reader, low-frequency card seeking characteristic information;
   In response to Step a, then Step b: receiving, by the card reader, card seeking response information, establishing a radio-frequency connection and a transaction process with a radio-frequency SIM card A, and opening a preset time window;
   In response to Step b, then Step c: when the preset time window closes, interrupting, by the card reader, the transaction process with the radio-frequency SIM card A and re-transmitting the low-frequency card seeking characteristic information;
   In response to Step c, then Step d: upon determining that the card reader does not receive any card seeking response information transmitted by another radio-frequency SIM card B, the card reader continues the transaction process with the radio-frequency SIM card A until the transaction completes; upon determining that the card reader receives card seeking response information transmitted by another radio-frequency SIM card B, ascertaining that a radio-frequency SIM card collision exists; and
   In response to Step d, then Step e: disconnecting, by the card reader, the connection with the radio-frequency SIM card A and a connection with the radio-frequency SIM card B.

2. The method of claim 1, after step a, further comprising: determining, by a radio-frequency SIM card A, whether an intensity of a low-frequency magnetic induction signal of the card reader reaches a preset threshold value; upon determining that the intensity reaches the preset threshold value, receiving, by the radio-frequency SIM card A, low-frequency card seeking characteristic information and transmitting the card seeking response information through a radio-frequency channel; upon determining that the intensity of the low-frequency magnetic induction signal does not reach the preset threshold value, the radio-frequency SIM card A does not establish a radio-frequency connection with the card reader.

3. The method of claim 1, wherein: the low-frequency card seeking characteristic information is generated by each card reader randomly, keeps unchanged in a card seeking process, but is different among different card seeking processes.

4. A collision detection method for a radio-frequency Subscriber Identity Module (SIM) card with low-frequency magnetic communication is used in a short-distance communication system comprising at least two card readers and multiple radio-frequency SIM cards, the method comprising:
   Step a: transmitting, by at least two card readers, same low-frequency card seeking characteristic information at a same time;
   In response to Step a, then Step b: receiving, by a card reader, card seeking response information transmitted by a radio-frequency SIM card A through a radio-frequency channel, wherein the card seeking response information carries an identification code IDA and a random number RN of the radio-frequency SIM card A;
   In response to Step b, then Step c: performing, by the card reader, an Media Access Control (MAC) operation on the card seeking characteristic information, the identification code IDA, and the random number RN, obtaining unique MAC information for confirming a pair of a card reader and a radio-frequency SIM card, and transmitting the MAC information through a low-frequency channel;

In response to Step c, then Step d: upon having received the MAC information, comparing, by the radio-frequency SIM card A, the MAC information with an MAC operation result of the radio-frequency SIM card A itself; upon determining that the MAC information received by the radio-frequency SIM card A is consistent with the MAC operation result of itself, a transaction between the card reader and the radio-frequency SIM card A is legal, and the card reader and the radio-frequency SIM card A continue the transaction until the transaction completes; and upon determining that the received MAC information is inconsistent with the MAC operation result of the radio-frequency SIM card A itself, ascertaining that a collision is detected; and In response to Step d, then Step e: disconnecting, by the card reader, a connection with the radio-frequency SIM card A.

5. The method of claim 3, wherein: in the Step d, the MAC operation result of the radio-frequency SIM card A itself is a result obtained after the radio-frequency SIM card A carries out an MAC operation on the low-frequency card seeking characteristic information, an identification code IDA of itself, and a random number RN generated by itself.

6. The method of claim 4, wherein: in the Step b, the random number RN is generated by the radio-frequency SIM card A, keeps unchanged in a card seeking process, but is different among different card seeking processes.

* * * * *